United States Patent
San Miguel et al.

(10) Patent No.: US 11,734,054 B2
(45) Date of Patent: Aug. 22, 2023

(54) TECHNIQUES FOR INTERFACING BETWEEN MEDIA PROCESSING WORKFLOWS AND SERVERLESS FUNCTIONS

(71) Applicant: NETFLIX, INC., Los Gatos, CA (US)

(72) Inventors: Francisco J San Miguel, San Jose, CA (US); Ameya Vasani, Los Gatos, CA (US); Dmitry Vasilyev, Los Gatos, CA (US); Chih Hao Lin, Los Gatos, CA (US); Xiaomei Liu, Los Gatos, CA (US); Naveen Mareddy, Cupertino, CA (US); Guanhua Ye, Los Gatos, CA (US); Megha Manohara, Los Gatos, CA (US); Anush Moorthy, Redwood City, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/690,071

(22) Filed: Nov. 20, 2019

(65) Prior Publication Data

US 2021/0067841 A1    Mar. 4, 2021

Related U.S. Application Data

(60) Provisional application No. 62/895,474, filed on Sep. 3, 2019.

(51) Int. Cl.
*G06F 9/44* (2018.01)
*G06F 9/448* (2018.01)
(Continued)

(52) U.S. Cl.
CPC .............. *G06F 9/48* (2013.01); *G06F 9/44* (2013.01); *G06F 9/547* (2013.01); *H04L 65/75* (2022.05);
(Continued)

(58) Field of Classification Search
CPC .. H04N 21/8166; H04N 21/858; G06F 9/547; H04L 65/601
See application file for complete search history.

(56) References Cited

U.S. PATENT DOCUMENTS 5,974,251 A * 10/1999 Ohta .................... G06F 40/151
                                                               717/109
6,157,961 A    12/2000 Kessler et al.
(Continued)

FOREIGN PATENT DOCUMENTS

EP            0 784 268 A2    7/1997

OTHER PUBLICATIONS

Huang et al., "SVE: Distributed Video Processing at Facebook Scale", https://doi.org/10.1145/3132747.3132775, 17 pages.
(Continued)

*Primary Examiner* — Hsiungfei Peng
(74) *Attorney, Agent, or Firm* — Artegis Law Group, LLP

(57) ABSTRACT

In various embodiments, a function build application compiles source code to generate an executable version of a function that has a first function signature. The function build application then replaces a first data type of a first parameter included in the first function signature with a second data type to generate a second function signature for a client stub function. Subsequently, the function build application generates a remote procedure call (RPC) client that includes the client stub function. Notably, the RPC client causes the function to execute when the client stub function is invoked. Advantageously, unlike conventional techniques that require manual generation of strongly typed functions, the function build application automatically customizes the RPC client for the function.

16 Claims, 7 Drawing Sheets

(51) Int. Cl.

| | | |
|---|---|---|
| *G06F 9/48* | (2006.01) | |
| *G06F 9/54* | (2006.01) | |
| *H04N 21/858* | (2011.01) | |
| *H04N 21/81* | (2011.01) | |
| *H04L 65/75* | (2022.01) | |
| *H04N 21/2343* | (2011.01) | |

(52) U.S. Cl.
CPC ....... *H04N 21/8166* (2013.01); *H04N 21/858* (2013.01); *H04N 21/2343* (2013.01); *H04N 21/8586* (2013.01)

(56) References Cited

U.S. PATENT DOCUMENTS

| | | | |
|---|---|---|---|
| 6,321,275 B1 | 11/2001 | McQuistan et al. | |
| 6,487,607 B1 | 11/2002 | Wollrath et al. | |
| 7,028,312 B1* | 4/2006 | Merrick | G06F 9/547 709/203 |
| 7,318,229 B1 | 1/2008 | Connor et al. | |
| 7,533,388 B1 | 5/2009 | Cavanaugh | |
| 9,696,971 B1 | 7/2017 | Wierda et al. | |
| 11,228,792 B1 | 1/2022 | Ram et al. | |
| 2007/0106541 A1* | 5/2007 | Raisanen | G06Q 10/063 705/7.26 |
| 2010/0077378 A1 | 3/2010 | Maguire et al. | |
| 2012/0047519 A1 | 2/2012 | Mebane, III | |
| 2014/0096148 A1 | 4/2014 | Yakovenko et al. | |
| 2016/0019037 A1* | 1/2016 | Varga | G06F 8/315 717/151 |
| 2016/0173648 A1* | 6/2016 | De Angelis | H04L 67/42 709/203 |
| 2018/0198824 A1* | 7/2018 | Pulapaka | G06F 9/455 |
| 2018/0217886 A1* | 8/2018 | Lahman | H04L 67/2804 |
| 2020/0183657 A1* | 6/2020 | On | G06F 9/547 |
| 2020/0288209 A1 | 9/2020 | Fassnacht et al. | |
| 2021/0127181 A1 | 4/2021 | Ramot | |

OTHER PUBLICATIONS

International Search Report for application No. PCT/US2020/048809 dated Nov. 30, 2020.

Non-Final Office Action received for U.S. Appl. No. 16/690,075 dated Aug. 17, 2021, 33 pages.

Final Office Action received for U.S. Appl. No. 16/690,075 dated Mar. 4, 2022, 24 pages.

Final Office Action received for U.S. Appl. No. 16/690,075 dated Jun. 3, 2022, 21 pages.

Non Final Office Action received for U.S. Appl. No. 16/690,075 dated Oct. 26, 2022, 25 pages.

Final Office Action received for U.S. Appl. No. 16/690,075 dated May 12, 2023, 23 pages.

* cited by examiner

TECHNIQUES FOR INTERFACING BETWEEN MEDIA PROCESSING WORKFLOWS AND SERVERLESS FUNCTIONS

CROSS-REFERENCE TO RELATED APPLICATIONS

This application claims the priority benefit of the U.S. Provisional Patent Application titled' "TECHNIQUES FOR INTERFACING BETWEEN MEDIA PROCESSING WORKFLOWS AND SERVERLESS FUNCTIONS," filed Sep. 3, 2019 and having Ser. No. 62/895,474. The subject matter of this related application is hereby incorporated herein by reference

BACKGROUND

Field of the Various Embodiments

Embodiments relate generally to computer science and media processing platforms and, more specifically, to techniques for interfacing between media processing workflows and serverless functions.

Description of the Related Art

As part of a typical media processing workflow, various custom algorithms are oftentimes executed on media items in a high-throughput fashion. For example, a subtitle timing algorithm could be executed on all of the movies included in a media content library as part of a quality assurance workflow that automatically detects subtitle timing errors within the media content library. Efficiently executing a custom algorithm on a large number of media items in high-throughput fashion is usually a complex and difficult process. Among other things, a software developer has to encapsulate the custom algorithm in an application that can efficiently acquire media items in a wide variety of media formats, can scale to enable concurrent execution across multiple compute instances, and can efficiently store the results generated when the custom algorithm is executed on the acquired media items. Encapsulating a custom algorithm in an application that is appropriately scalable requires significant manual effort as well as a good amount of technical know-how with respect to the custom algorithm itself, various media processing techniques, such as encoding and decoding, data, instruction, and network communication techniques, and resource allocation and load balancing techniques. A lack of knowledge in any one of these areas can prevent a software developer from being able to successfully develop and deploy a custom algorithm that can properly execute on media items in high-throughput fashion.

In some implementations designed to address the above challenges, custom algorithms are encapsulated into functions that are defined as part of a fixed parallel workflow for executing custom algorithms on media assets. In the fixed workflow, the functions are then executed via containers that are dynamically scaled to execute across multiple compute instances. In the fixed workflow, media and communication operations are performed automatically in an effort to reduce the manual design effort and amount of technical knowledge required to apply the custom algorithm to a wide range of media items. One drawback of these types of implementations, though, is that, because the workflow is fixed, implementing relatively complex workflows, such as hierarchical workflows and dynamic workflows that vary based on previous workflow states, is typically not possible. Another drawback is that these fixed workflows do not usually support "strongly typed functions," which are functions that receive input via a set of inputs having explicit types and provide output via a set of outputs having explicit types. As is well-known, any input or output that is not explicitly defined and typed can be associated with an increase in run-time errors and decreased testability.

To enable a custom algorithm to be more flexibly incorporated into a wider range of workflows, a software developer can encapsulate the custom algorithm into a function that is scaled individually by a serverless platform (e.g., using cloud-based resources). One drawback of this approach, however, is that each "serverless function" requires either a predefined or a manually-generated invocation mechanism that allows clients to remotely invoke the serverless function. If a serverless function is not strongly typed, then a predefined invocation mechanism that implements a generic interface can be used. Otherwise, the software developer has to manually generate a customized invocation mechanism. Manually generating such an invocation mechanism is tedious, time-consuming, and requires familiarity with the interfaces expected by the relevant workflow(s) and/or supported by the relevant serverless platforms. Further, writing serverless functions also requires an in-depth understanding of communication and media processing techniques, which, as discussed above, can create substantial technical hurdles for many software developers.

As the foregoing illustrates, what is needed in the art are more effective techniques for executing custom algorithms on media items.

SUMMARY

One embodiment sets forth a computer-implemented method for executing custom algorithms on media items. The method includes performing one or more compilation operations on source code to generate an executable version of a function that has a first function signature; replacing a first data type of a first parameter included in the first function signature with a second data type to generate a second function signature for a client stub function; and generating a remote procedure call ("RPC") client that includes the client stub function, where the RPC client causes the function to execute when the client stub function is invoked.

At least one technical advantage of the disclosed techniques relative to the prior art is that, with the disclosed techniques, custom algorithms can be more flexibly and easily executed on media items in high-throughput fashion. Because each custom algorithm is encapsulated in a different individually-scaled serverless function that can be remotely invoked via an associated stub function included in a remote procedure call (RPC) framework, the custom algorithms be can executed from multiple different types of workflows and can be executed with high-throughput. Further, because an associated stub function is automatically generated for each serverless function, an invocation mechanism for each serverless function does not need to be manually generated, as is the case in prior art approaches involving strongly typed functions. In addition, because communication and media processing translation operations are automatically performed on data used and generated by the serverless functions, the overall amount of technical know-how and manual effort required to develop serverless functions that can successfully execute custom algorithms on a wide range of media items can be reduced. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
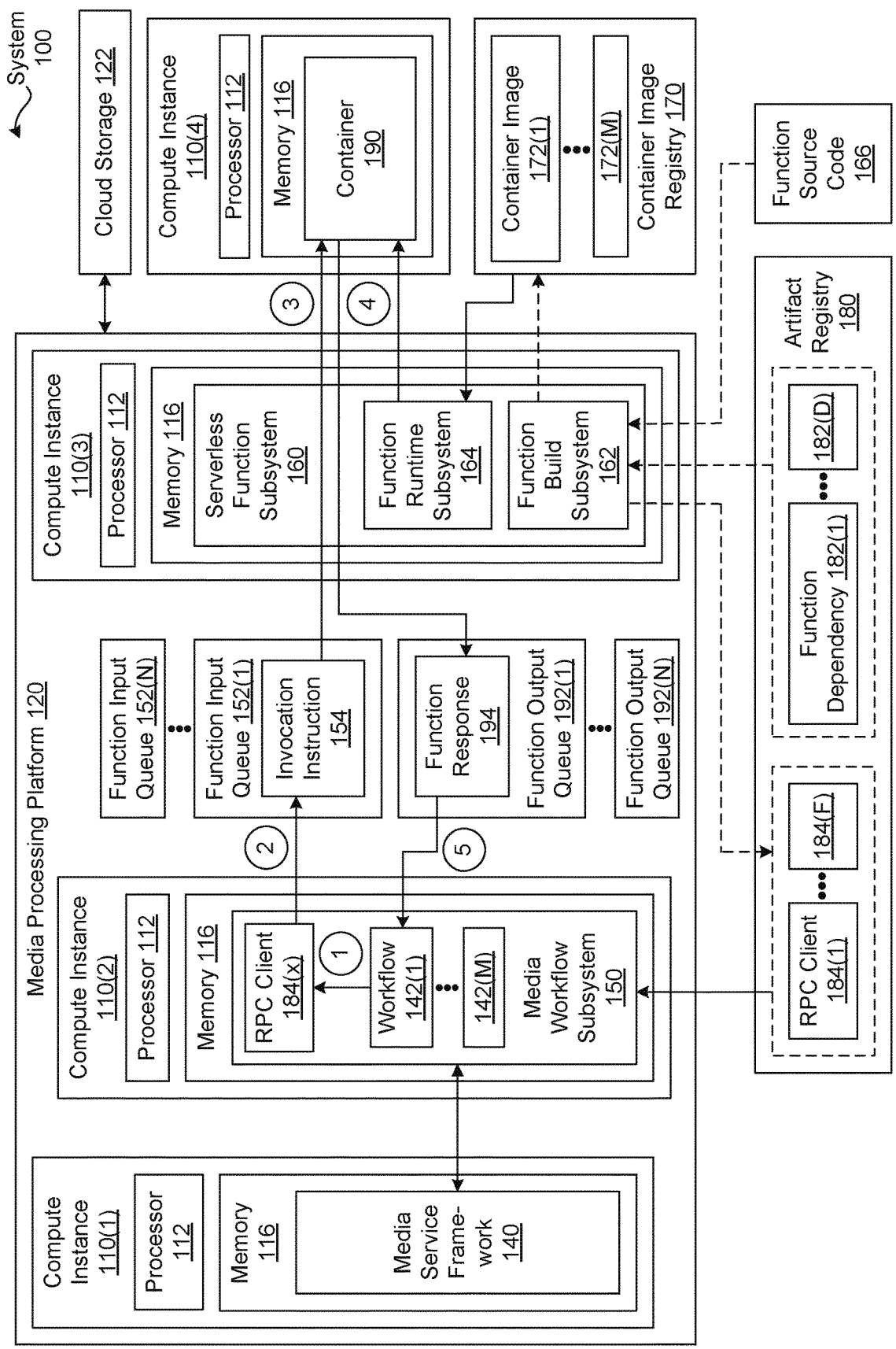
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

Many media providers have media content libraries that include numerous media items. Each media item includes any amount and type of content associated with any media format in any technically feasible fashion. Examples of media items include, without limitation, an MPEG-4 video file that includes a source video sequence and an H.264 encoded video file that includes an encoded video sequence. A video streaming service provider could have a media content library that, for each of thousands of video titles, includes an MPEG-4 video file and multiple H.264 encoded video files.

Oftentimes, to achieve one or more objectives, the media provider executes various custom algorithms on media items in a media content library in a high-throughput fashion. Some examples of objectives include, without limitation, A/B testing, catalog-wide re-encoding, watermarking frames included in video sequences, selecting compelling images or sequences of frames for advertising purposes, and detecting subtitle timing errors. A manual approach to designing a custom algorithm that can reliably and efficiently execute on a large number of media items in a high-throughput fashion typically requires significant manual effort as well as a good amount of technical know-how. In particular, a software developer usually has to be familiar with the custom algorithm itself, various media processing techniques, such as encoding and decoding, data, instruction, and network communication techniques, and resource allocation and load balancing techniques.

In some implementations designed to address the above challenges, custom algorithms are encapsulated into functions that are defined as part of a fixed parallel workflow. In the fixed workflow, containers execute custom algorithms on media items, the number of containers executing each custom algorithm is dynamic and individually scaled, and many types of media and communication operations are performed automatically. One drawback of these types of fixed workflows is that implementing relatively complex workflows, such as hierarchical workflows and dynamic workflows that vary based on previous workflow states, is typically not possible. Another drawback is that these fixed workflows do not usually support "strongly typed" functions that receive input via a set of inputs having explicit types and provide output via a set of outputs having explicit types. As is well-known, any input or output that is not explicitly defined and typed can be associated with an increase in run-time errors and decreased testability.

To enable a custom algorithm to be more flexibly incorporated into a wider range of workflows, a software developer can encapsulate the custom algorithm into a function that is scaled individually by a serverless platform (e.g., using cloud-based resources). One drawback of this approach, however, is that if a serverless function is strongly typed, then the software developer has to manually generate a customized invocation mechanism. Manually generating such an invocation mechanism is tedious, time-consuming, and requires familiarity with the interfaces expected by the relevant workflow(s) and/or supported by the relevant serverless platforms. Further, since the serverless platform does not automatically perform media and communication operations, writing serverless functions also requires an in-depth understanding of communication and media processing techniques.

With the disclosed techniques, however, workflows are built and executed via a media workflow subsystem that supports complex workflows, such as hierarchical workflows and dynamic workflows that vary based on previous workflow states. A serverless function subsystem generates an automatically customized remote procedure call ("RPC") framework for each serverless function, where each serverless function encapsulates any number of custom algorithms. The RPC framework for a given serverless function enables the media workflow subsystem to remotely execute the serverless function. Both before and after executing a serverless function, the associated RPC framework may automatically perform any number of communication and/or media processing operations. For instance, in some embodiments, the RPC framework associated with an "encoder" serverless function automatically extracts a sequence of video frames from a video file prior to passing the sequence of video frames to the encoder serverless function for encoding. Further, each serverless function is executed via an individually and automatically scaled number of containers.

At least one technical advantage of the disclosed techniques relative to the prior art is that the serverless function subsystem enables custom algorithms to be flexibly and easily executed on media items in high-throughput fashion. Encapsulating custom algorithms into individually-scaled serverless functions enables the custom algorithms to be executed with high-throughput and from multiple different workflows. Unlike prior art approaches involving strongly typed functions, the customized RPC frameworks automatically provide proper invocation mechanisms. Furthermore, because the RCP frameworks automatically perform communication and media processing translation operations on data used and generated by the serverless functions, the overall amount of technical know-how and manual effort required to develop serverless functions that can successfully execute custom algorithms on a wide range of media items can be reduced. These technical advantages represent one or more technological advancements over prior art approaches.

System Overview

FIG. 1 is a conceptual illustration of a system 100 configured to implement one or more aspects of the various embodiments. As shown, the system 100 includes, without limitation, cloud storage 122, any number of compute instances 110, a container image registry 170, an artifact registry 180, a media processing platform 120, and function source code 166. In alternate embodiments, the system 100 may include any amount and type of cloud storage 122, any number of container image registries 170, any number of artifact registries 180, and any number of discrete portions of function source code 166. For explanatory purposes, multiple instances of like objects are denoted with reference numbers identifying the object and parenthetical numbers identifying the instance where needed.

Any number of the components of the system 100 may be distributed across multiple geographic locations. In alternate embodiments, any portion of any number of the compute instances 110, the container image registry 170, the artifact registry 180, and the media processing platform 120 may be implemented across any number and type of clouds and any number of distributed computing environments in any combination.

The cloud storage 122 may include, without limitation, any amount and type of cloud-based memory resources that store any amount and type of data in any form. In some embodiments, the cloud storage includes memory associated with any number of remote servers that are accessed in any technically feasible fashion (e.g., via the Internet). In some embodiments, the cloud storage 122 may include any amount of memory resources that are capable of securely storing data. The cloud storage 122 is also referred to herein as "cloud-based storage."

As shown, each of the compute instances 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of the compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each compute instance 110 is configured to implement one or more functions, one or more applications, and/or one or more subsystems of applications. For explanatory purposes only, each application is depicted as residing in the memory 116 of a single compute instance 110 and executing on a processor 112 of the single compute instance 110. However, in alternate embodiments, the functionality of each application and each subsystem may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

The container image registry 170 is a storage and distribution systems for container images 172. Each container image 172 is a static file including stand-alone executable code that provides an independent package of software including, without limitation, any number of applications, any number of functions, and any dependencies associated with the applications and the functions. When executed on one of the compute instances 110, the container image 172 generates a container 190 that provides the dependencies and can execute any included applications and the included functions. Each container 190 resides in the memory 116 of one of the compute instances 110 and executes on the processor 112 of one of the compute instances 110. Any number of the compute instances 110 may implement the containers 190. Further, each compute instance 110 may simultaneously implement any number of containers 190 associated with any number of container images 172. In alternate embodiments, the container image registry 170 may be replaced with any type of storage (e.g., the cloud storage 122).

The artifact registry 180 is a storage and distribution systems for artifacts. An artifact may be any file that is associated with the software development process. Examples of artifacts include, without limitation, function dependencies 182, binaries, tarballs, executable libraries, a Java archive file ("JAR"), etc. In alternate embodiments, the artifact registry 180 may be replaced with any type of storage (e.g, the cloud storage 122).

The media processing platform 120 is configured to execute custom algorithms on media items in a high-throughput fashion as part of media processing workflows. Each media item includes, without limitation, any amount and type of video content, encoded video content, audio content, encoded audio content, and text content in any combination and using any media format. Some examples of media items include, without limitation, an MPEG-4 video file that includes a source video sequence, an H.264 encoded video file that includes an encoded video sequence, a Windows Media Audio file that includes a source audio sequence, and a text file that includes text content.

Efficiently executing a custom algorithm on a large number of media items in high-throughput fashion is usually a complex and difficult process. Manually encapsulating a custom algorithm in an application that is appropriately scalable requires significant manual effort as well as a good amount of technical know-how with respect to the custom algorithm itself, various media processing techniques, such as encoding and decoding, data, instruction, and network communication techniques, and resource allocation and load balancing techniques.

In an effort to reduce the manual design effort and amount of technical knowledge required to apply a custom algorithm to a wide range of media items, some conventional media processing platforms define a fixed parallel workflow for executing custom algorithms on media assets. In the fixed workflow, media and communication operations are performed automatically, custom algorithms are encapsulated into functions that are executed via containers, and the number of containers executing each custom algorithm is dynamic and individually scaled. One drawback of these types of fixed worfklows, though, is that, because the workflow is fixed, implementing relatively complex workflows, such as hierarchical workflows and dynamic workflows that vary based on previous workflow states, is typically not possible. Another drawback is that these fixed workflows do not usually support strongly typed functions.

To enable a custom algorithm to be more flexibly incorporated into a wider range of workflows, a software developer can encapsulate the custom algorithm into a function that is scaled individually by a serverless platform (e.g., using cloud-based resources). One drawback of this approach, however, is that each strongly typed "serverless function" requires a manually-generated invocation mechanism that allows client devices to remotely invoke the serverless function. Manually generating such an invocation mechanism is tedious, time-consuming, and requires familiarity with the interfaces expected by the relevant workflow(s) and/or supported by the relevant serverless platforms. Further, writing these types of serverless functions also requires an in-depth understanding of communication and media processing techniques.

Customizing Remote Procedure Call Frameworks for Media Items

To address the above problems, the media processing platform 120 implements any number of remote procedure call (RPC) frameworks, where each RPC framework enables remote execution of any number of serverless functions that execute custom algorithms on media items. The RPC framework for a given serverless function includes, without limitation, an RPC client 184 that executes in a "client" computing environment and a container image 172 that is used to generate any number of containers 190 within which a serverless function agent (not shown in FIG. 1) can execute the serverless function.

Advantageously, the serverless function agent automatically performs any number of communication and/or media processing operations on items provided by a client on behalf of the serverless function. As referred to herein, a "communication operation" is any operation that facilitates the transmission of any type of data to or from a discrete set of encapsulated instructions (e.g., a function, a process, a method, etc). Examples of communication operations include, without limitation, transmission operations, storage operations, compression operations, decompression operations, encryption operations, decryption operations, etc. In alternate embodiments, each RPC framework may be associated with more than one serverless function.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

In particular and for explanatory purposes only, the generation of the RPC framework and the execution of a serverless function via the RPC framework is described herein in the context of workflows 154, container images 172, containers 190, specific communication techniques, specific data-interchange formats, specific execution techniques, and the Java programming language. However, the techniques described herein are applicable to generating a remote invocation mechanism that performs any number of communications and/or media operations on behalf of the serverless function in any technically feasible fashion and using any number and type of programming languages (e.g., Python), scripting languages, communication techniques, data-interchange formats, execution techniques, etc.

In various embodiments, the RPC frameworks are implemented as part of the media processing platform 120. The media processing platform 120 is a platform for building and executing workflow-driven media-centric services. As shown, the media processing platform 120 includes, without limitation, a media service framework 140, a media workflow subsystem 150, a serverless function subsystem 160, any number of function input queues 152, and any number of function output queues 192.

For explanatory purposes only, each of the media service framework 140, the media workflow subsystem 150, and the serverless function subsystem 160 is depicted as residing in the memory 116 and executing on the processor 112 of a single compute instance 110. In alternate embodiments, the media service framework 140, the media workflow subsystem 150, and the serverless function subsystem 160 may each execute on any number of compute instances 110 that may be distributed across multiple geographic locations. Furthermore, any number of the compute instance 110 may be implemented across any number and type of clouds and any number of distributed computing environments in any combination.

The media service framework 140 is an application programming interface ("API") framework for building and executing media services, where each media service executes any number of the workflows 142 via the media workflow subsystem 150. The media workflow subsystem 150 implements dynamic inference techniques to build and execute any number of workflows 142 based on rules specified by users. As part of each workflow 142, any number of serverless functions (not shown in FIG. 1) may be invoked via the associated RPC clients 184. The serverless function subsystem 160 builds any number of serverless functions and the associated RPC clients 184 and subsequently executes the serverless functions on-demand. Each serverless function may encapsulate any number (including zero) of customized algorithms that execute on media items.

As shown, the serverless function subsystem 160 includes, without limitation, a function build subsystem 162 and a function runtime subsystem 164. As depicted with dashed lines, the function build system 162 generates the container images 172 and the RPC clients 184 based on the function source code 166 and any number and type of the function dependencies 182. The function source code 166 may define and organize any number and type of functions (not shown) in any technically feasible fashion in any type of programming language or scripting language. For explanatory purposes only, the term "function" and the term "method" are used interchangeably herein. Each of the functions defined in the function source code 166 is also referred to herein as a "serverless function" to indicate that the serverless function subsystem 160 is to perform scaling, communications, and media operations on behalf of the function.

Each of the serverless functions may encapsulate any number (including zero) of custom algorithms that operate on any number and type of media items. Each of the serverless functions includes any number of strong-typed parameters and may use any number of data types, including any number of data types that are defined by the serverless function subsystem 160. An example of a data type that is defined by the serverless function subsystem 160 is a "MountedVideoFrameSequence" which is a series of video frames that are mounted to a local file system associated with the executing serverless function.

Importantly, the source code 166 may include any number of annotations that indicate the serverless functions, the parameters of the serverless functions, and any parameter transformations that the serverless function agent is to perform. Each parameter transformation may involve, without limitation, any number of communication operations and any number of media processing operations. Some examples of parameter transformations are unpacking video frames from a source video file, splitting an audio file into component channels, mounting remote objects, and uploading files. As part of the parameter transformations, the serverless function agent may perform any amount and type of error checking and may handle underlying communication with external systems, including details such as retires and throttling.

The function build subsystem 162 does not use the annotations when generating the compiled source code that is included in the container images 172. However, for each serverless function, the function build subsystem 162 uses the annotations to generate a stub function that is used by clients (e.g., as part of the workflow 142) to remotely invoke the serverless function. As referred to herein, a 'client" may be any application that exists in a different address space from the serverless function.

The stub function for a given serverless function includes, without limitation, the return type of the serverless function and a function signature that is derived from the function signature of the serverless function. In particular, if a parameter is associated with one or more parameter transformations, then the function build subsystem 162 replaces the data type specified for the parameter with a client data type that is associated with the parameter transformation to generate the stub function. As a result, the function signature of the stub function may differ from the function signature of the associated serverless function. As is well known, a function signature specifies a function name in addition to the names and types of any number (including zero) of parameters.

After compiling the function source code 166 to generate function compiled code, the function build subsystem 162 generates any number of container images 172. Each of the container images 172 includes, without limitation, the function compiled code for any number of the serverless functions, any number and type of the function dependencies 182, any number of function-specific OS dependencies, and the serverless function agent. In alternate embodiments, a given container image 172 may omit the serverless function agent and the serverless function agent is bound to the container image 172 when each container 190 is instantiated from the container image 172. The function build subsystem 162 then publishes the container image 172 to the container image registry 170. In alternate embodiments, the function build subsystem 162 may provide the container image 172 to the function runtime subsystem 164 in any technically feasible fashion.

In a complementary fashion, after generating the stub functions, the function build subsystem 162 generates any number of RPC clients 184. Each of the RPC clients 184 includes, without limitation, the stub functions corresponding to any number of serverless functions and any amount and type of executable code that communicates the arguments provided by a client to the function runtime subsystem 164. As a general matter, for each serverless function, the associated RPC client 184 defines an explicit contract between the serverless function and a client and expresses any associated parameter transformations. In operation, the RPC client 184 enables the client to execute the serverless function via an invocation of the associated stub function. The function build subsystem 162 then publishes the RPC clients 184 to the artifact registry 180. In alternate embodiments, the function build subsystem 162 may provide the RPC clients 184 to the media workflow subsystem 150 and/or any number of other clients in any technically feasible fashion.

The function runtime subsystem 164 ensures that the explicit contracts between the serverless functions and the clients and any associated parameter transformations expressed via the RPC clients 184 are honored in a scalable fashion via the containers 190. As part of an initialization process, for each serverless function, the function runtime subsystem 164 establishes a different function input queue 152 and a different function output queue 192. Accordingly, the function runtime subsystem 164 generates the function input queues 152(1)-152(N) and the function output queues 192(1)-192(N), where N is the total number of serverless functions.

Each of the function input queues 152 includes, without limitation, any number of invocation instructions 154, where each of the invocation instructions 154 corresponds to an invocation of the stub function corresponding the serverless function associated with the function input queue 152. In some embodiments, each of the invocation instructions 154 may be associated with a priority. Each of the function output queues 192 includes, without limitation, any number of function responses 194. Each of the function responses 194 corresponds to an invocation instruction 154 that the serverless function agent has finished executing. The function runtime subsystem 164 may establish and maintain any type of function input queues 152 and function output queues 192 in any technically feasible fashion.

Also as part of the initialization process, the function runtime subsystem 164 configures a resource scheduler to generate containers 190 from the container images 172 based on the work that is to be performed. In general, each container 190 is associated with a serverless function. To generate a new container 190 that is associated with a given serverless function, the resource scheduler generates a new container 190 based on the container image 172 that is associated with the serverless function and configures the container 190 to execute the serverless function. Importantly, each of the containers 190 is configured to execute a single serverless function irrespective of the total number of serverless functions that are included in the associated container image 172. For example, if a given container image 172 is associated with X serverless functions, then the function runtime subsystem 164 could generate X containers 190 based on the container image 172, where each of the X containers 190 would be configured to execute a different serverless function.

The resource scheduler may execute asynchronously to other operations executed by the function runtime subsystem 164 and the containers 190 and may be implemented and configured in any technically feasible fashion. Furthermore, the resource scheduler may execute any number and type of resource scheduling algorithms to generate the containers 190. For instance, in some embodiments, the resource scheduler monitors the function input queues 152 to determine whether to scale up or down the number of containers 190 associated with each serverless function. For a given serverless function, the resource scheduler does not initially generate any associated containers 190. If the resource scheduler detects that one or more invocation instructions 154 are in the function input queue 152 associated with the serverless function, then the resource scheduler generates a new container 190 that is associated with the serverless function. Subsequently, as the number of invocation instructions 154 in the function input queue 152 increases, the resource scheduler scales up the number of containers 190 associated with the serverless function. Similarly, as the invocation instructions 154 are processed and the number of invocation instructions 154 remaining the in the function input queue 152 decreases, the resource scheduler scales down the number of containers 190 associated with the serverless function.

In alternate embodiments, the resource scheduler ensures that a minimum number of containers 190 are active to reduce processing latency attributable to the time required to start new containers 190. In the same or other alternate embodiments, for each serverless function, the resource scheduler creates one associated container 190 per N invocation instructions 154 in the associated function input queue 152 and the container 190 terminates after processing the invocation instructions 154.

As part of the initialization process, the serverless function agent included in each container 190 is configured to communicate with clients via the function input queue 152 and the function output queue 192 corresponding to the serverless function associated with the container 190. Accordingly, each serverless function agent is associated with one function input queue 152 and one function output queue 192. In operation, each serverless function agent continuously polls the associated function input queue 152 in an attempt to acquire an unfulfilled invocation instruction 154. After acquiring the invocation instruction 154 from the function input queue 152, the serverless function agent performs any number of deserialization operations, any number of demarshaling operations, and any number of associated input parameter transformations to generate a new set of arguments for the associated serverless function. The serverless function agent then causes the associated serverless function to be invoked with the new set of arguments. After the serverless function finishes executing, the serverless function agent performs any associated output parameter transformations and then adds the function response 194 to the associated function output queue 192.

The function runtime subsystem 164 may generate any number of containers 190 for each serverless function via a serverless platform (not shown) that provides cloud-based resources and, optionally, includes any amount and type of auto-scaling functionality. At any given time, the function runtime subsystem 164 may adjust the number of containers 190 associated with each serverless function in any technically feasible fashion. For instance, in some embodiments, the function runtime subsystem 164 executes any number of priority-based resource scheduling algorithms to determine when to generate new containers 190 based on the number and priority of the invocation instructions 154 included in each of the function input queues 152. In other embodiments, for each serverless function, the function runtime subsystem 164 instantiates a different container 190 for each of the invocation instructions 154 included in the associated function input queue 152.

In various embodiments, the function runtime subsystem 164 may configure any number and type of other applications to perform any amount and type of operations associated with executing the serverless functions. For instance, in various embodiments, the function runtime subsystem 164 may configure any number and type of applications to perform any number and type of container management operations, cloud management operations, resource management operations, scheduling operations, etc.

For explanatory purposes only, a sequence of numbered bubbles depicts operations that occur when the stub function corresponding to a serverless function that is associated with the container image 172(y) is invoked as part of the workflow 142(1). The container image 172(y) is one of the container images 172 included in the container image registry 170. As depicted with the bubble numbered 1, the media workflow subsystem 150 invokes a stub function that is included in the RPC client 184(x) as part of the workflow 150(1). The media workflow subsystem 150 invokes the stub function with a set of arguments that corresponds to the set of parameters for the stub function. Note that the media workflow subsystem 150 may acquire any number of the RPC clients 184 in any technically feasible fashion and at any time.

In response to the invocation of the stub function, the RPC client 184(x) generates an invocation instruction 154. The RPC client 184(x) may generate the invocation instruction 154 in any technically feasible fashion and any technically feasible format. For instance, in some embodiments, the RPC client 184(x) performs any number of serialization and/or marshaling operations on the set of arguments with which the stub function was invoked to generate a message that is the invocation instruction 154.

As depicted with the bubble numbered 2, the RPC client 184 adds the invocation instruction 154 to the function input queue 152. In response to polling and as depicted with the bubble numbered 3, the serverless function agent executing within one of the containers 190 associated with the function input queue 152 acquires the invocation instruction 154 from the function input queue 152. The serverless function agent performs any number of input parameter transformations, causes the associated serverless function to execute, and performs any number of output parameter transformations as per the invocation instruction 154. As depicted with the bubble numbered 4, the serverless function agent adds the function response 194 returned by the serverless function to the associated function output queue 192. As depicted with the bubble numbered 5, the media workflow subsystem 150 then acquires the function response 194 from the function output queue 192 for use in the workflow 142(1).

Figure 2:
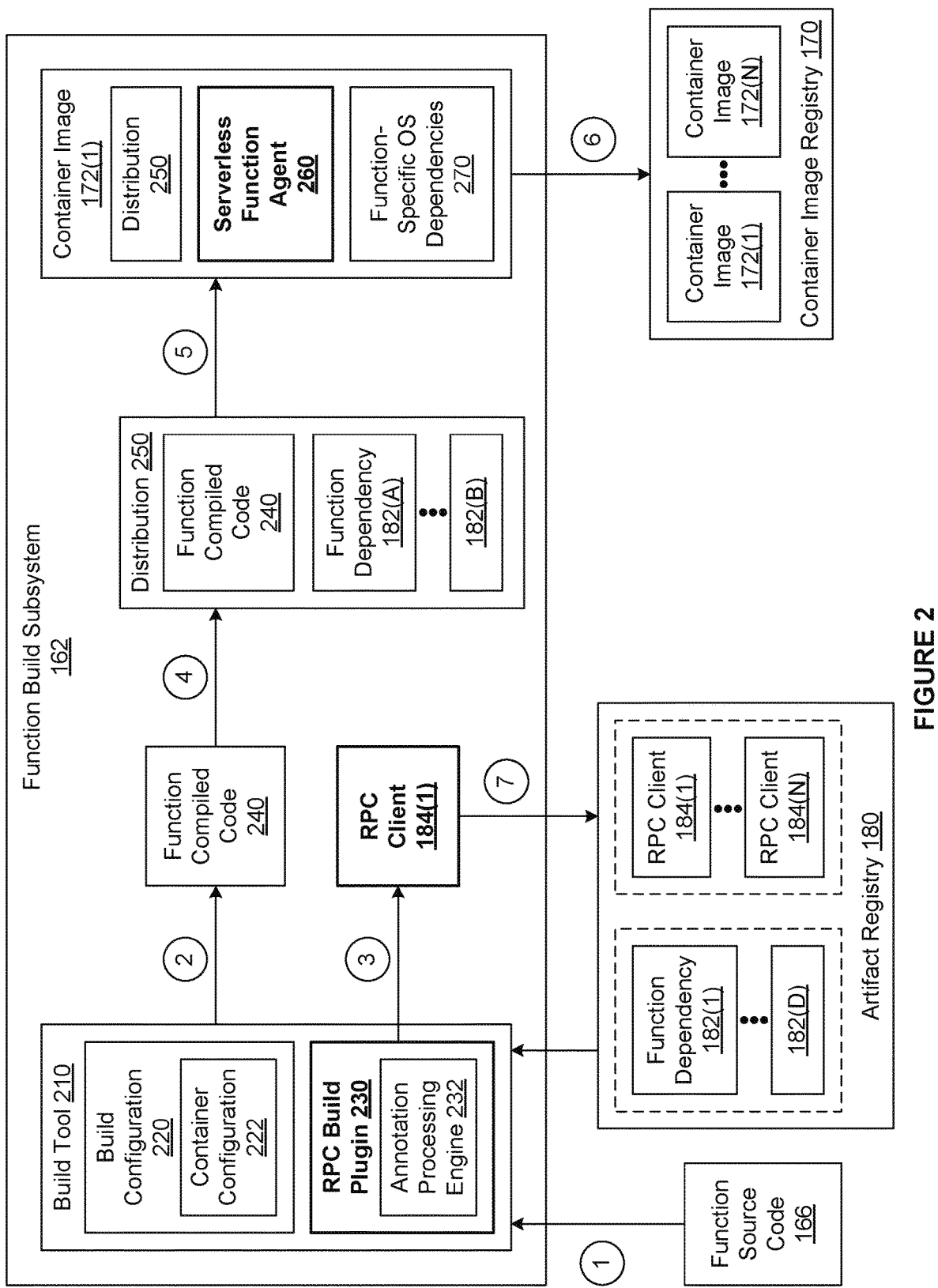
FIG. 2 is a more detailed illustration of the function build subsystem of FIG. 1, according to various embodiments.

FIG. 2 is a more detailed illustration of the function build subsystem 162 of FIG. 1, according to various embodiments. As shown the function build subsystem 162 includes, without limitation, a build tool 210, function compiled code 240, the RPC client 184(1), a distribution 250, and the container image 172(1). In alternate embodiments, the function build subsystem 162 may include any number X of RPC clients 184, any number Y of distributions 250, and any number Z of container images 172, where each of X, Y, and Z may be any positive integer.

In operation, the function build subsystem 162 executes a build process on the function source code 166 to generate the RPC client(s) 184, generate the container image(s) 172, publish the RPC client(s) 184 to the artifact registry 180, and publish the container image(s) 172 to the container image registry 170. In alternate embodiments, the function build subsystem 162 may provide the RPC client(s) 184 and the container image(s) 172 to clients in any technically feasible fashion instead of publishing the RPC client(s) 184 and the container image(s) 172 to, respectively, the artifact registry 180 and the container image registry 170. The function build subsystem 162 may be invoked any number of times in serial, parallel, or any combination thereof for any number and type of discrete portions of source code 166 (e.g, source code files).

Each of the serverless functions has a return type and a function signature. The return type indicates the data type of the function response 194 returned by the serverless function. A return type of void indicates that the serverless function does not return a function response 194. The function signature specifies the name of the function, the name and type of any number (including zero) of input parameters, and the name and type of any number (including zero) of output reference parameters. As is well known, parameters refer to variables that are used in a function while arguments refer to the actual values for the parameters that are passed to the function when the function is invoked. Each input parameter represents an object that is an input to the serverless function. By contrast, each output reference parameter represents an object that is modified by the serverless function.

The return type and the parameter types (i.e., the types of the parameters) may be any technically feasible data types, including one of any number of data types that are defined by the serverless function subsystem 160. Importantly, the source code 166 may include any number of annotations that indicate the serverless functions, the parameters of the serverless functions, and any parameter transformations that a serverless function agent 260 is to perform. The serverless function subsystem 160 may define the number, type, format, and meaning of attributes in any technically feasible fashion.

For instance, in some embodiments, the signature of the serverless function is preceded by the annotation "@MpFunction," each input parameter is preceded by an annotation "@Mpnput (type=transformation type)" and each output reference parameter is preceded by an annotation "@MpOutputRef (type=transformation type)." The transformation type can be "none" or one of any number of transformation types that are defined by the serverless function subsystem 160. If the parameter type is "none," then the parameter is referred to herein as an "unmanaged parameter" and the parameter is not associated with a parameter transformation. Otherwise, the parameter is referred to herein as a "managed parameter" and one or more parameter transformations are to be performed between a "client argument" having a client data type and a "managed argument" for the managed parameter. Each parameter transformation may involve, without limitation, any number of communication operations and any number of media processing operations. The parameter transformations and the client argument may be defined based on the transformation type, the data type of the managed parameter, and/or whether the managed parameter is an input managed parameter or an output reference managed parameter.

The serverless function subsystem 160 may define any number of transformation types that are applicable to only input parameters, any number of transformation types that are applicable to only output reference parameters, and any number of transformation types that are applicable to both input parameters and output reference parameters. For instance, in some embodiments, the serverless function subsystem 160 defines the following transformation types that are applicable to only input parameters: VIDEO_FRAME_SEQUENCE and AUDIO_OBJECT. The serverless function subsystem 160 does not define any transformation types that are applicable to only output reference parameters. And the serverless function subsystem 160 defines the following transformation types that are applicable to both input parameters and output reference parameters: CLOUD_OBJECT, CLOUD_OBJECTS, MEDIA_DOCUMENT, and DOCUMENT_ACCESSOR.

For a managed input parameter, a client invokes the stub function with a set of arguments that includes a client argument having the client data type associated with the managed input parameter. When the serverless function agent 260 acquires the associated invocation instruction 154, the serverless function agent 260 performs an input parameter transformation based on the client argument to generate a corresponding argument for the managed parameter of the serverless function. For a managed output reference parameter, after the serverless function finishes executing, the serverless function agent 260 performs an output parameter transformation based on the modified argument for the managed parameter to generate a corresponding modified client argument having the client data type associated with the managed parameter. In some embodiments, for a managed output reference function, the serverless function agent 260 may perform an input parameter transformation based on the client argument to generate a corresponding argument for the serverless function and an output parameter transformation based on the modified argument after the serverless function finishes executing.

In alternate embodiments, the serverless function subsystem 160 may enforce any number and type of requirements for specifying and/or annotating serverless function interfaces. For instance, in some embodiments, the serverless function subsystem 160 requires that each serverless function include a non-annotated media processing context (e.g., MpContext) input parameter that provides a general context. An example of information that could be specified in the general context is the location of a working directory where temporary user data may be stored while the serverless function is running.

For explanatory purposes only, FIG. 2 depicts an exemplary build process that generates a single container image 172(y) and a single RPC client 184(1) as a series of numbered bubbles. As depicted with a bubble numbered 1, to initiate the build process, the build tool 210 acquires the function source code 166. The build tool 210 includes, without limitation, a build configuration 220 and an RPC build plugin 230. The build configuration 220 specifies any amount and type of information that customizes the build process in any technically feasible fashion. For example, the build configuration 220 may specify any number of the function dependencies 182 that are stored in the artifact registry 180.

As shown, the build configuration 220 includes, without limitation, a container configuration 222 that specifies any amount and type of information that is to be included in the container image 172. In alternate embodiments, the build configuration 220 may include any number and type of container configurations 222, where each container configuration 222 may be associated with a different subset of the serverless functions defined in the source code 166. The build tool 210 may acquire the build configuration 220 and the container configuration 222 in any technically feasible fashion.

Subsequently, as depicted with the bubble numbered 2, the build tool 210 performs any number of compilation operations based on the function source code 166 and the build configuration 222 to generate the function compiled code 240. The function compiled code 240 is executable code that includes, without limitation, an executable version of each of the serverless functions defined in the function source code 166.

The RPC build plugin 230 is a software component that adds RPC functionality to the build tool 210. The RPC functionality enables the build tool 210 to generate the RPC client(s) 184. In alternate embodiments, the build tool 210 may implement any amount of RPC functionality instead of or in addition to the RPC build plugin 230. In some such embodiments, the RPC functionality may be integrated into the build tool 210 directly instead of via the RPC build plugin 230, and the RPC build plugin 230 may therefore be omitted from the build tool 210. The RPC build plugin 230 includes, without limitation, an annotation processing engine 232.

As depicted with the bubble numbered 3, the annotation processing engine 232 generates the RPC client 184 based on the annotations in the function source code 166. The RPC client 184 includes, without limitation, the stub functions corresponding to the serverless functions defined in the function source code 166 and any amount and type of executable code that communicates the data associated with invocations of the stub functions to the serverless function agent 260.

The RPC client 184 may be specified in any technically feasible fashion and any format. For instance, in some embodiments, the RPC client 184 is a Java Archive file that includes, without limitation, the stub functions, implementation code that performs any number of serialization operations and/or any number of marshaling operations to generate the invocation instruction 154, and implementation code that adds the invocation instruction 154 to the proper input function queue 152.

Figure 3:
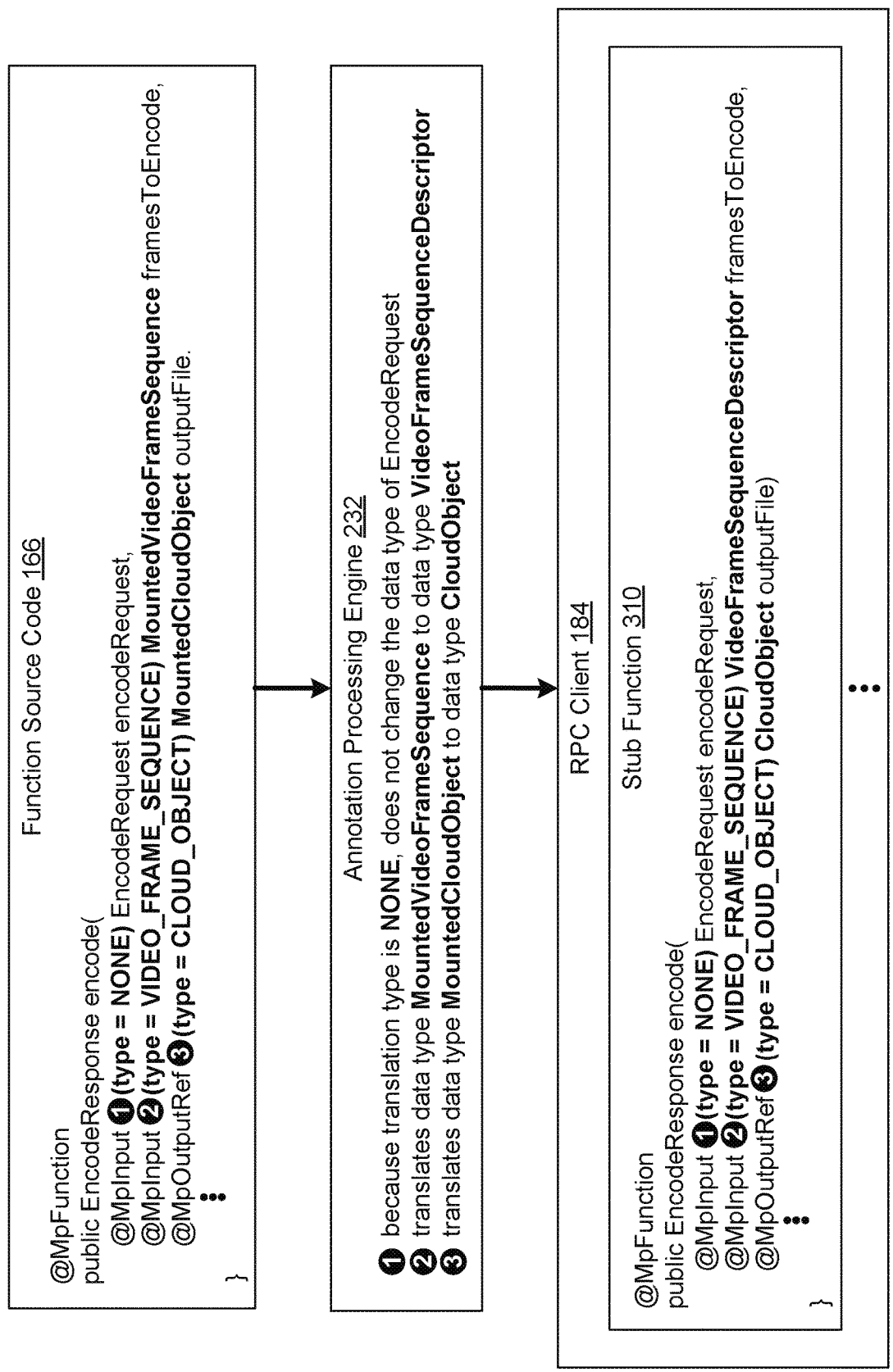
FIG. 3 illustrates how the annotation processing engine of FIG. 2 generates a stub function corresponding to an exemplary serverless function, according to various embodiments.

The annotation processing engine 232 may generate the RPC client 184 in any technically feasible fashion that is consistent with the annotations specified in the function source code 166. For instance, in some embodiments, to generate the stub function corresponding to a serverless function, the annotation processing engine 232 identifies and extracts the return type and signature of the serverless function from the function source code 166 based on the annotations. The annotation processing engine 232 then identifies the managed parameters and the associated transformation types based on the annotations included in the extracted signature. Based on the transformation types, the annotation processing engine 232 modifies the data types of the managed parameters specified in the extracted signature to generate a modified extracted signature. Subsequently, the annotation processing engine 232 adds the extracted return type to the modified extracted signature and then appends an empty function body to generate the stub function. FIG. 3 illustrates how the processing engine 232 generates the stub function for an exemplary serverless function.

As depicted with the bubble numbered 4, the build tool 210 then generates the distribution 250 based on the function compiled code 240. The distribution 250 includes, without limitation, the function compiled code 240 and any number of the function dependencies 182. The build tool 210 may identify and acquire the function dependencies 182 in any technically feasible fashion. For instance, in some embodiments, the build tool 210 identifies the function dependencies 182 based on the function source code 166 and then acquires the function dependencies 182 from the artifact registry 180.

Subsequently, as depicted with the bubble numbered 5, the build tool 210 generates the container image 172. As shown, the container image 172 includes, without limitation, the distribution 250, function-specific operating system ("OS") dependencies 270, and the serverless function agent 260. The build tool 210 may identify and acquire the function-specific OS dependencies 270 for each of the serverless functions associated with the distribution 250 in any technically feasible fashion. For instance, in some embodiments, the function-specific OS dependencies 270 are specified in the container configuration 222. As outlined in conjunction with FIG. 1 and described in greater detail in conjunction with FIG. 4, the serverless function agent 260 fulfills the contracts between the serverless functions and the clients and any associated transformations expressed via the RPC clients 184.

In alternate embodiments, the serverless function agent 260 is not included in the container image 172 but is present, along with the function compiled code 240 included in the associated container image 172, when each container 190 is instantiated. For instance, in some alternate embodiments, the serverless function agent 260 is included in the function runtime subsystem 164 and bound to the container 190 when the container 190 is instantiated from the container image 172.

As depicted with the bubble numbered 6, the function build subsystem 162 publishes the container image 172 to the container image registry 170. In alternate embodiments, the function build subsystem 162 may provide the container image 172 to the function runtime subsystem 164 in any technically feasible fashion. The function build subsystem 162 also publishes the RPC client 184 to the artifact registry 180 (depicted with the bubble numbered 7). In alternate embodiments, the function build system 162 may provide the RPC client 184 to the media workflow subsystem 150 and/or to any number and type of other clients in any technically feasible fashion.

FIG. 3 illustrates how the annotation processing engine 232 of FIG. 2 generates a stub function 310 for an exemplary serverless function, according to various embodiments. As shown, the function source code 166 defines a serverless function named encode that has a return type of EncodeResponse. To indicate that the function is a serverless function that is to be managed by the serverless function subsystem 160, the return type of EncodeResponse follows the annotation @MpFunction. The signature of the serverless function includes the input parameter encodeRequest, the input parameter framesToEncode, and the output reference parameter outputFile. The input parameter encodeRequest follows the annotation "@MpInput (type=NONE)" indicating that encodeRequest is an unmanaged input parameter.

By contrast, the input parameter framesToEncode follows the annotation "@MpInput (type=VIDEO_FRAME_SEQUENCE) indicating that framesToEncode is a managed input parameter having the transformation type of VIDEO_FRAME_SEQUENCE. A managed input parameter having the transformation type of VIDEO_FRAME_SEQUENCE has the data type of MountedVideoFrameSequence and a corresponding client data type of VideoFileSequenceDescriptor. A parameter having the data type of MountedVideoFrameSequence represents a locally-mounted sequence of video frames. A parameter having the data type of VideoFrameSequenceDescriptor represents an object that specifies, without limitation, a Universal Resource Locator (URL") for a video file in the cloud, metadata about the file (e.g. video format), and a description of frames in the video file are to be processed.

Together, the RPC client 184 and the serverless function agent 260 provide an RPC framework that automatically performs input parameter transformation operations on a client-provided argument having the type of videoFrameSequenceDescriptor to generate a corresponding MountedVideoFrameSequence that is encoded by the serverless function encode. More specifically, the serverless function agent 260 uses the URL and the metadata to interpret a video file stored in a cloud and then performs a network mount of the frames that are to be processed to generate a MountedVideoFrameSequence.

The output reference parameter outputFile follows the annotation "@MpOutputRef(type=CLOUD OBJECT) indicating that outputFile is a managed output reference parameter having the transformation type of CLOUD_OBJECT. A managed output reference parameter having the transformation type of CLOUD_OBJECT has the data type of MountedCloudObject and a corresponding client data type of CloudObject. A parameter having the data type of MountedCloudObject represents a local path for a file. A parameter having the data type of CloudObject represents a URL for a file. Together, the RPC client 184 and the serverless function agent 260 provide an RPC framework that automatically performs an output parameter transformation on a MountedCloudObject that is generated by the serverless function encode to generate a corresponding CloudObject. After the serverless function encode finishes executing, the serverless function agent 260 copies a file from the local path specified via the argument for the output reference parameter outputPath to the URL specified via the corresponding client argument for the output reference parameter outputPath.

As described previously herein, the annotation processing engine 232 generates the stub function 310 corresponding to the serverless function encode. As shown, the stub function that is included in the RPC client 184 is associated with the serverless function encode. To generate the stub function 310, the annotation processing engine 232 replaces the data type specified in the function source code 166 with the client data type specified by the associated transformation type to generate the signature of the stub function 310. The annotation processing engine 232 then appends the signature of the stub function 310 to the return type of the serverless function and appends a empty function body to the signature of the stub function 310.

Because the parameter encodeType is an unmanaged parameter, the annotation processing engine 232 does not change the data type of the parameter encodeType. By contrast, because framesToEncode is a managed input parameter having the translation type of VIDEO_FRAME_SEQUENCE, the annotation processing engine 232 replaces the data type of MountedVideoFrameSequence with the corresponding client data type of VideoFileSequenceDescriptor. And, because outputFile is a managed output reference parameter having the transformation type of CLOUD_OBJECT, the annotation processing engine 232 replaces the data type of MountedCloudObject with the corresponding client data type of CloudObject.

The only differences between the function signature of the resulting stub function 310 and the function signature of the serverless function encode are that the client data types for the managed parameters replace the corresponding data types specified in the serverless function. The resulting stub function 310 includes the modified function signature and the return type but omits the remainder of the serverless function encode.

Executing Invocation Instructions

Figure 4:
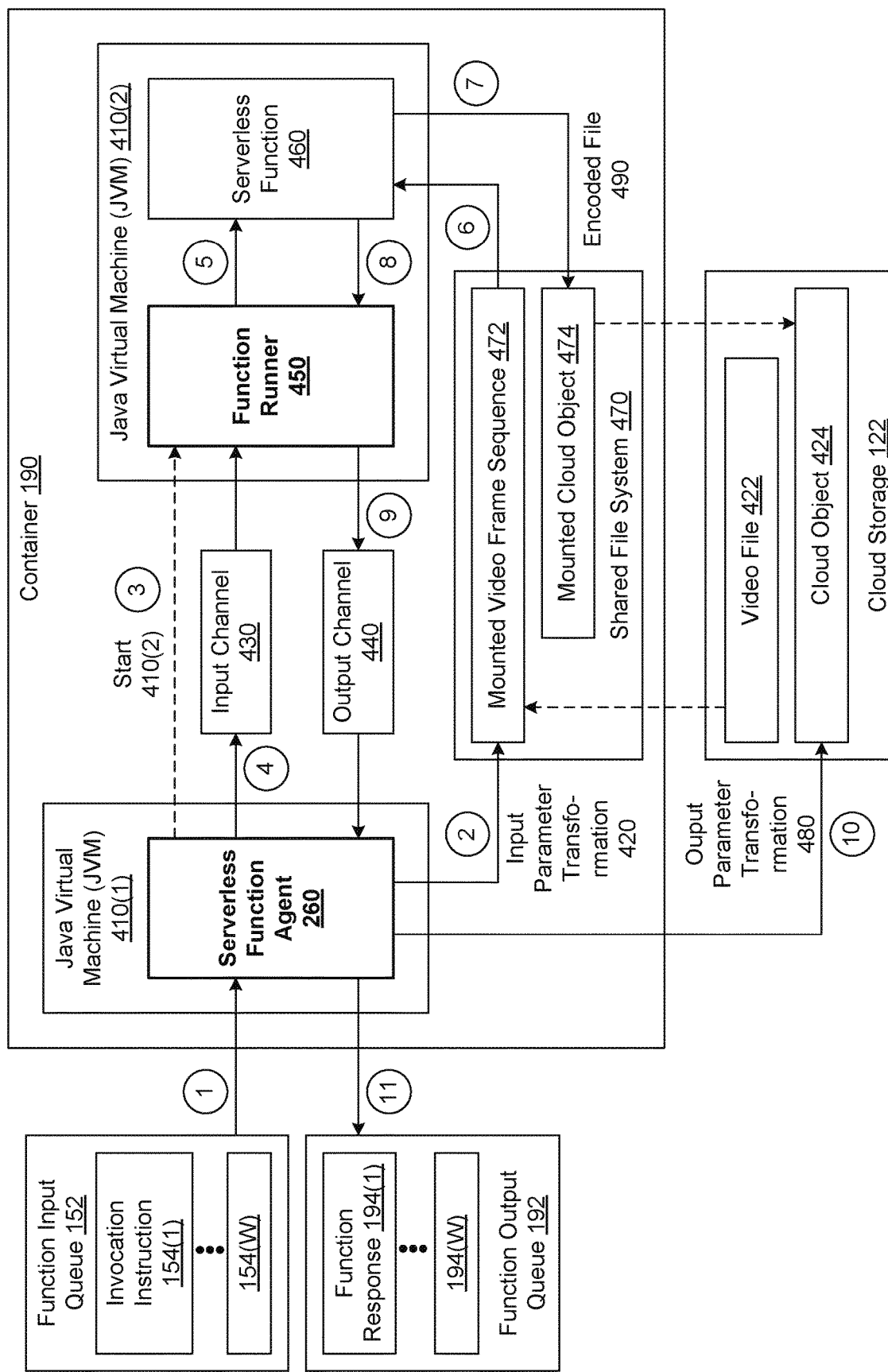
FIG. 4 illustrates how the serverless function agent of FIG. 2 processes an invocation instruction, according to various embodiments.

FIG. 4 illustrates how the serverless function agent 260 of FIG. 2 processes an invocation instruction 154, according to various embodiments. When the container 190 is instantiated based on one of the container images 172, the container 190 starts a Java Virtual Machine ("JVM") 410 that executes the serverless function agent 260. The serverless function agent 260 identifies the function input queue 152 and the function output queue 192 associated with the container 190. The serverless function 260 may identify the function input queue 152 and the function output queue 192 in any technically feasible fashion. For instance, in some embodiments, the serverless function agent 260 identifies the function input queue 152 and the function output queue 192 via environment variable(s). The serverless function agent 260 then begins to continuously poll the function input queue 152 in order to acquire the invocation instruction 154.

For explanatory purposes only, the serverless function agent 260 acquires the function invocation instruction 154 that is generated by the RPC client 184 when the exemplary stub function 310 of FIG. 3 is invoked as part of one of the workflows 142. Accordingly, the serverless function agent 260 is associated with a serverless function 460 named "encode" as described in conjunction with FIG. 3. Also for explanatory purposes only, FIG. 4 illustrates the operations that the serverless function agent 260 performs to process the function invocation instruction 154 as a series of numbered bubbles.

As depicted with the bubble number 1, the serverless function agent 260 acquires the invocation instruction 154 from the function input queue 152. For each of the managed parameters of the serverless function 460, the serverless function agent 260 performs any number of input parameter transformations 420 as per the invocation instruction 154. Referring to FIG. 3, the function source code 166 defining the serverless function 460 named encode specifies an unmanaged parameter encodeRequest, a managed input parameter framesToEncode having a transformation type of VIDEO_FRAME_SEQUENCE, and a managed output reference parameter outputFile having a transformation type of CLOUD_OBJECT.

Referring back to FIG. 4 and as depicted with the bubble numbered 2, the serverless function agent 260 performs the input parameter transformation 420 associated with the transformation type of VIDEO_FRAME_SEQUENCE based on a client argument having a client data type of VideoFileSequenceDescriptor that is specified via the function invocation instruction 154. More precisely, the serverless function agent 260 transforms a video file 422 that is included in the cloud storage 122 to a mounted video frame sequence 472 that is included in a shared file system 470.

As depicted with the bubble numbered 3, the serverless function agent 260 starts another JVM 410(2) that executes a function runner 450 (also referred to herein as a "function runner application"). In alternate embodiments, instead of starting the JVM 410(2) that executes the function runner 450, the serverless function agent 260 may start and configure any application to execute the serverless function 460 in any technically feasible fashion and in any environment. For instance, in some embodiments, the serverless function agent 260 may be replaced with a Python function runner and the serverless function agent 260 causes the Python function runner to execute as a Python process.

The serverless function agent 260 may start the JVM 410(2) that executes the function runner 450 in any technically feasible fashion. For instance, in some embodiments, the function runner 450 is provided as part of the serverless function agent runtime and is injected into the JVM 410(2). As shown, the JVM 410(2) shares the shared file system 470 with the JVM 410(1). Further, the JVM 410(1) and the JVM 410(2) communicate using an input channel 430 and an output channel 440. The input channel 430 is a named pipe that transmits data from the JVM 410(1) to the JVM 410(2) and the output channel 430 is a named pipe that transmits data from the JVM 410(2) to the JVM 410(1).

As depicted with the bubble numbered 4, the serverless function agent 260 transmits the invocation instruction 154 to the function runner 450 via the input channel 430. Based on the function invocation instruction 154, the function runner 450 searches through the classpath of the JVM 410(2) for the serverless function 460 and then, as depicted with the bubble number 4, invokes the serverless function 460 with the proper arguments. Notably, the function runner 450 specifies the local path for the mounted video frame sequence 472 as the argument for the framesToEncode input parameter.

The serverless function 460 accesses the mounted video frame sequence 472 (depicted with the bubble numbered 6) and then executes the encapsulated custom media algorithm to encode the mounted video frame sequence 472. While executing, the serverless function 460 generates an encoded file 490 that includes, without limitation, an encoded version of each video frame included in the mounted video frame sequence 472. As depicted with the bubble numbered 7, the serverless function 460 stores the encoded file 490 as a mounted cloud object 474 in the shared file system 470 and sets the output reference parameter encodedFrames to specify the local path for the mounted cloud object 474. Accordingly, the serverless function 460 modifies the output reference parameter encodedFrames.

After the serverless function 460 finishes executing, the serverless function 460 returns the function response 194 to the function runner 450 (depicted with the bubble numbered 8). Subsequently, and as depicted with the bubble numbered 9, the function runner 450 transmits the function response 194 to the serverless function agent 260 via the output channel 440. In alternate embodiments, the function runner 450 may modify the function response 194 to include additional information, such as a document identifier, prior to transmitting the function response 194 to the serverless function agent 260.

For each of the managed output reference parameters of the serverless function 460, the serverless function agent 260 performs any number of output parameter transformations 480 as per the invocation instruction 154. Accordingly, as depicted with the bubble numbered 10, the serverless function agent 260 performs the output parameter transformation 490 associated with the transformation type of CLOUD_OBJECT based on the modified argument for the output reference parameter encodedFrames. As shown, the performing the output parameter transformation 480 involves uploading the mounted cloud object 474 to the cloud storage 122 to generate the cloud object 424. The cloud object 424 can be accessed by the client that invoked the stub function 310 via the URL specified as the modified argument for the output reference parameter encoded frames. To finish executing the function invocation instruction 154 and as depicted with the bubble numbered 11, the serverless function agent 260 adds the function response 194 to the function output queue 192.

Figure 5:
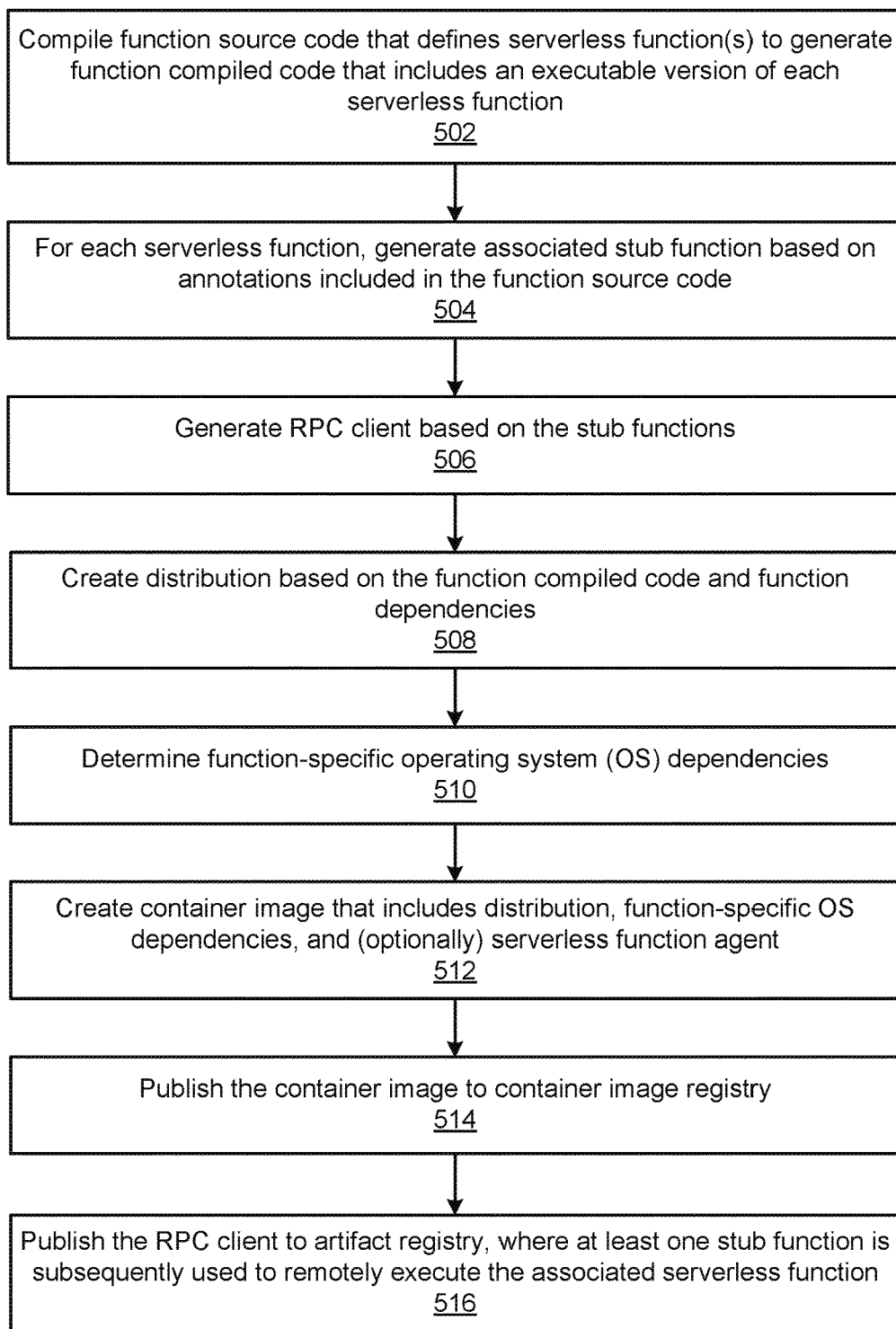
FIG. 5 sets forth a flow diagram of method steps for generating remote process call (RPC) frameworks for serverless functions, according to various embodiments.

FIG. 5 sets forth a flow diagram of method steps for generating remote process call (RPC) frameworks for serverless functions, according to various embodiments. Although the method steps are described with reference to the systems of FIGS. 1-4, persons skilled in the art will understand that any system configured to implement the method steps, in any order, falls within the scope of the various embodiments.

As shown, a method 500 begins at step 502, where the build tool 210 compiles the function source code 166 that defines one or more serverless functions 460 to generate the function compiled code 240 that includes an executable version of each of the serverless functions 460. At step 504, for each of the serverless functions 460, the RPC build plugin 230 generates the associated stub function 310 based on annotations included in the function source code 166. At step 506, the RPC build plugin 230 generates the RPC client 184 based on the stub functions 310.

At step 508, the build tool 210 creates the distribution 250 based on the function compiled code 250 and any number of the function dependencies 182. At step 510, the build tool 210 determines the function-specific OS dependencies 270. At step 512, the build tool 210 creates the container image 172 that includes the distribution 250, the function-specific OS dependencies 270, and (optionally) the serverless function agent 260. At step 514, the function build system 162 publishes the container image 172 to the container image registry 170. In alternate embodiments, the function build subsystem 162 may provide the container image 172 to the function runtime subsystem 164 in any technically feasible fashion.

At step 516, the function build subsystem 162 publishes the RPC client 184 to the artifact registry 180. In alternate embodiments, the function build subsystem 162 may provide the RPC client 184 to the media workflow subsystem 150 and/or any number of other clients in any technically feasible fashion. The method 500 then terminates. Notably, at least one stub function 310 that is included in the RPC client 184 is subsequently used to remotely execute the associated serverless function 460.

Figure 6A:
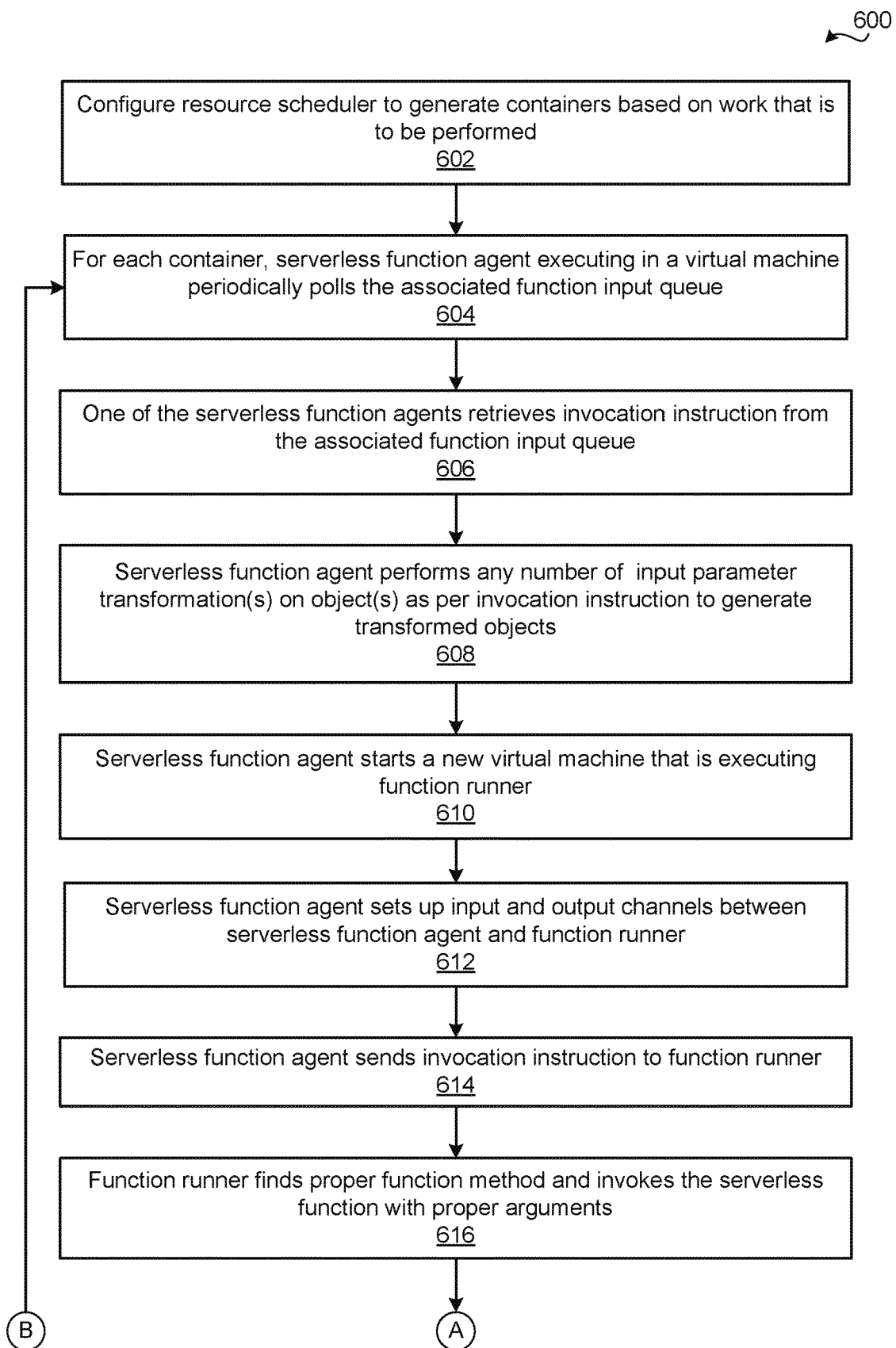
FIGS. 6A-6B set forth a flow diagram of method steps for executing serverless functions on media items using RPC frameworks, according to various embodiments.
Figure 6B:
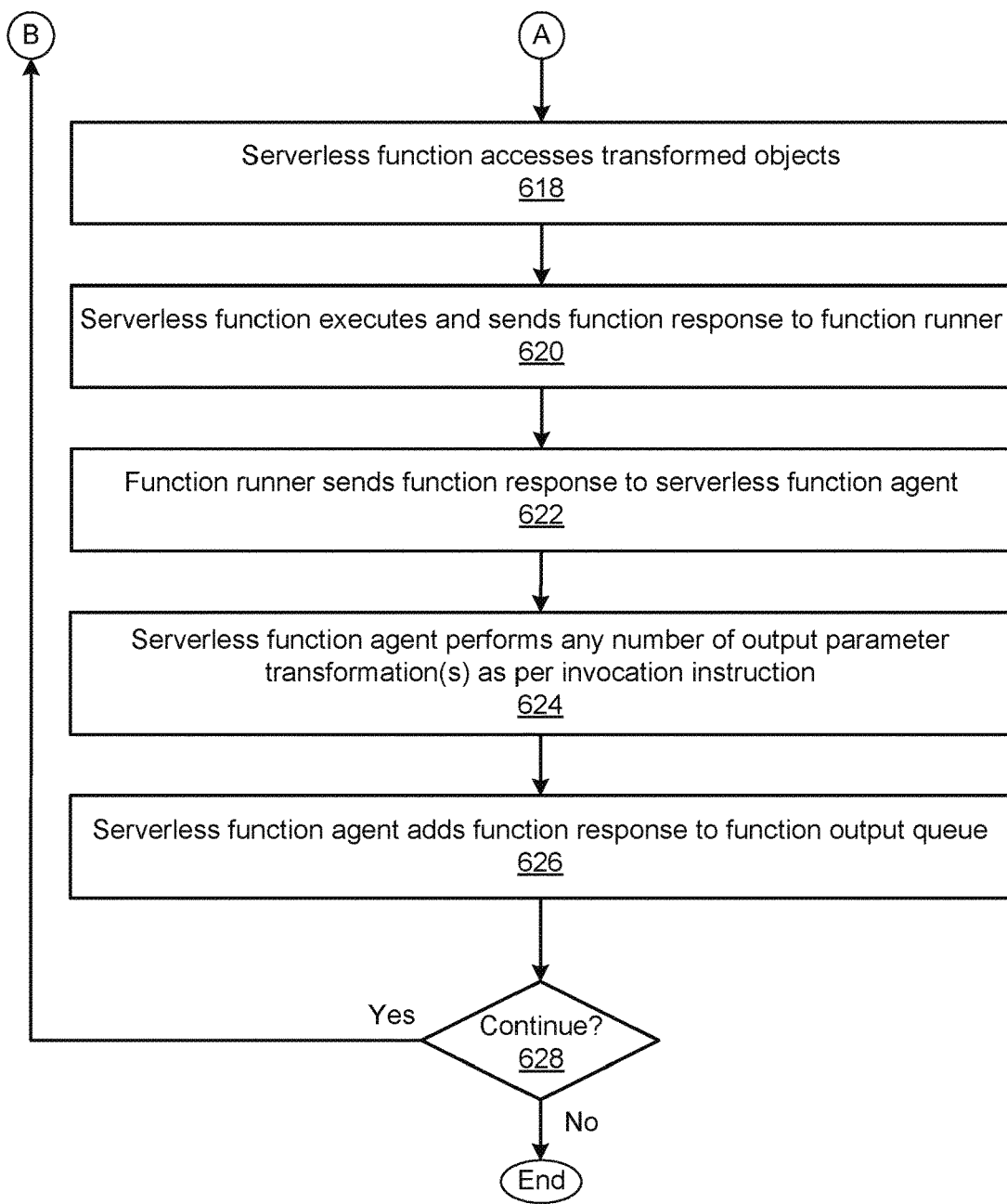

FIGS. 6A-6B set forth a flow diagram of method steps for executing serverless functions on media items using RPC frameworks, according to various embodiments. Although the method steps are described with reference to the systems of FIGS. 1-4, persons skilled in the art will understand that any system configured to implement the method steps, in any order, falls within the scope of the various embodiments.

As shown, a method 600 begins at step 602, where the serverless function subsystem 160 configures a resource scheduler to generate the containers 190 based on the work that is to be performed. Note that the resource schedule may subsequently perform any number and type of scheduling operations asynchronously to and concurrently with any number of steps 604-628. In particular, for each of the serverless functions 460, the resource schedule may independently vary the number of the associated containers 190 over time.

At step 604, for each of the containers 190, the serverless function agent 260 executing in a virtual machine (e.g., the JVM 410(1)) periodically polls the associated function input queue 152. The function input queue 152 associated with a given container 190 corresponds to the serverless function 460 associated with the container 190. At step 606, one of the serverless function agents 260 retrieves one of any number of invocation instructions 154 included in the associated function input queue 152. At step 608, the serverless function agent 260 performs any number of input parameter transformation(s) 420 on any number of objects as per the invocation instruction 154 to generate transformed objects.

At step 610, the serverless function agent 260 starts a new virtual machine (e.g., the JVM 410(2)) that is executing the function runner 450. At step 612, the serverless function agent 260 sets up the input channel 430 and the output channel 440 between the serverless function agent 260 and the function runner 450. At step 614, the serverless function agent 260 sends the invocation instruction 154 to the function runner 450. In alternate embodiments, instead of executing steps 608-614, the serverless function agent 260 may start and configure any application to execute the serverless function 460 as per the invocation instruction 154 in any technically feasible fashion and in any environment.

At step 616, the function runner 450 finds the proper function method and invokes the serverless function 460 with proper arguments. At step 618, the serverless function 460 accesses the transformed objects. At step 620, the serverless function 460 executes and sends the function response 194 to the function runner 450. At step 622, the function runner 450 sends the function response 194 to the serverless function agent 260.

At step 624, the serverless function agent 260 performs any number (including zero) of output parameter transformation(s) 480 as per the invocation instruction 154. At step 626, the serverless function agent 260 adds the function response 194 to the associated function output queue 192. At step 628, the function runtime subsystem 164 determine whether to continue executing. The function runtime subsystem 164 may determine whether to continue executing in any technically feasible fashion. For instance, in some embodiments, the function runtime subsystem 164 may determine to continue executing until receiving a termination request from a graphical user interface ("GUI"). If, at step 628, the function runtime subsystem 164 determines not to continue executing, then the method 600 terminates.

If, however, at step 628, the function runtime subsystem 164 determines to continue executing, then the method 600 returns to step 604, where each of the serverless function agents 260 continues to poll the associated function input queue 154. The function runtime subsystem 164, the serverless function agents 260, the function runners 450, and the serverless functions 460 continue to cycle through steps 604-628 until the function runtime subsystem 164 determines not to continue executing. Importantly, as persons skilled in the art will recognize, the serverless function agents 260, the function runners 450, and the serverless functions 460 included in any number of different containers 190 may perform any number of steps 604-626 in parallel to one another. In this fashion, any number of clients may remotely invoke any number individually scaled serverless functions 460 via the RPC clients 184 concurrently, sequentially, or any combination thereof.

In sum, the disclosed techniques may be used to efficiently and flexibly execute custom algorithms on media items in a high-throughput fashion. In some embodiments, a media service framework provides interfaces (e.g, APIs) to workflows that are built and executed via a media workflow subsystem. RPC clients that are generated by a function build subsystem can be invoked as part of a workflow to remotely execute corresponding serverless functions via a function runtime subsystem. The input to the function build subsystem is function source code that defines any number of serverless functions, where each serverless function encapsulates a custom algorithm and has an annotated, strongly typed function interface. Notably, each parameter of each serverless function may be annotated with one of any number of transformation types, where each transformation type specifies a different parameter transformation that includes any number of communication and/or media processing operations. The function build subsystem generates a container image and a remote procedure call ("RPC") client based on the function source code. The container image includes function compiled code, dependencies for the serverless function(s), and a serverless function agent that implements any parameter transformations. For each serverless function, the RPC client defines an explicit contract between the serverless function and a client and expresses any associated parameter transformations.

At runtime, for each serverless function, the function runtime subsystem launches one or more containers derived from the associated container image via a serverless platform that provides cloud-based, auto-scaled resources. To use a given serverless function, a client invokes a corresponding stub function that is included in the associated RPC client. In response to an invocation of one of the stub functions, the RPC client generates an invocation instruction and adds the invocation to a function invocation queue that is associated with the serverless function. The serverless function agent executing within one of the containers associated with the serverless function acquires the invocation instructions. Based on the invocation instruction, the serverless function agent performs any number of input parameter transformation(s) based on the set of arguments with which the stub function was invoked to generate a new set of arguments corresponding to the serverless function. The serverless function agent then causes the serverless function to be invoked based on the new set of arguments. After the serverless function finishing executing, the serverless function agent performs output parameter transformation(s) based on any number of modified arguments for output references to provide output reference arguments that can be accessed by the client that invoked the stub function. The serverless function agent then adds the function response to an output function queue that is associated with the serverless function.

At least one technical advantage of the disclosed techniques relative to the prior art is that the serverless function subsystem may more effectively execute custom algorithms on media items. In particular, because the function runtime subsystem automatically scales the number of containers that execute each serverless function, custom algorithms encapsulated in the serverless functions can be executed with high-throughput. Furthermore, because each of the serverless functions can be invoked via a customized remote procedure call (RPC) framework, the custom algorithms can be executed from multiple different types of workflows. Importantly, because the serverless functions and the associated stub functions are strongly typed, the amount of run-time errors can be decreased and the testability of workflows can be increased relative to workflows that do not support strongly typed interfaces. Further, because the function build subsystem automatically generates an associated stub function for each serverless function, an invocation mechanism for each serveless function does not need to be manually generated, as is the case in prior art approaches involving strongly typed functions. In addition, because the serverless function agent automatically performs communication and media processing transformations on data used and generated by the serverless functions, the overall amount of technical know-how and manual effort required to develop serverless functions that can successfully execute custom algorithms on a wide range of media items can be reduced. These technical advantages represent one or more technological advancements over prior art approaches.

1. In some embodiments, a computer-implemented method comprises performing one or more compilation operations on source code to generate an executable version of a function that has a first function signature; replacing a first data type of a first parameter included in the first function signature with a second data type to generate a second function signature for a client stub function; and generating a remote procedure call (RPC) client that includes the client stub function, wherein the RPC client causes the function to execute when the client stub function is invoked.

2. The computer-implemented method of clause 1, further comprising determining the second data type based on at least one annotation included in the source code.

3. The computer-implemented method of clauses 1 or 2, further comprising determining that the RPC client is to be generated for the function based on at least one annotation included in the source code.

4. The computer-implemented method of any of clauses 1-3, wherein the first data type specifies a uniform resource locator (URL) to a file, and the second data type specifies a local path to a file.

5. The computer-implemented method of any of clauses 1-4, wherein the first data type is associated with a video file, and the second data type is associated with a sequence of video frames.

6. The computer-implemented method of any of clauses 1-5, wherein the first data type is associated with an audio file, and the second data type is associated with one or more component channels of audio.

7. The computer-implemented method of any of clauses 1-6, wherein generating the RPC client comprises aggregating the client stub function with implementation code, wherein the implementation code includes one or more serialization operations that are to be performed on the set of arguments to generate an invocation message, and wherein the invocation message causes the function to execute when the client stub function is invoked.

8. The computer-implemented method of any of clauses 1-7, wherein the second function signature is further generated by replacing a third data type of a second parameter included in the first function signature with a fourth data type.

9. The computer-implemented method of any of clauses 1-8, further comprising aggregating the second function signature and an empty function body to generate the client stub function.

10. The computer-implemented method of any of clauses 1-9, wherein the function encapsulates at least one algorithm that executes on one or more media items.

11. In some embodiments, one or more non-transitory computer readable media include instructions that, when executed by one or more processors, cause the one or more processors to perform the steps of performing one or more compilation operations on source code to generate an executable version of a function that has a first function signature; replacing a first data type of a first parameter included in the first function signature with a second data type to generate a second function signature for a client stub function; and generating a remote procedure call (RPC) client that includes the client stub function, wherein the RPC client causes the function to execute when the client stub function is invoked.

12. The one or more non-transitory computer readable media of clause 11, further comprising determining the second data type based on at least one annotation included in the source code.

13. The one or more non-transitory computer readable media of clauses 11 or 12, wherein the first parameter comprises an input parameter or an output reference parameter.

14. The one or more non-transitory computer readable media of any of clauses 11-13, wherein the first data type specifies a uniform resource locator (URL) to a file, and the second data type specifies a local path to a file.

15. The one or more non-transitory computer readable media of any of clauses 11-14, wherein the first data type is associated with a video file, and the second data type is associated with a sequence of video frames.

16. The one or more non-transitory computer readable media of any of clauses 11-15, wherein generating the RPC client comprises aggregating the client stub function with implementation code, wherein the implementation code causes the function to execute in a first environment when the client stub function is invoked in a second environment.

17. The one or more non-transitory computer readable media of any of clauses 11-16, wherein the second function signature is further generated by retaining a third data type of a second parameter included in the first function signature based on one or more annotations included in the source code.

18. The one or more non-transitory computer readable media of any of clauses 11-17, wherein the client stub function is invoked as part of a workflow in which one or more operations are performed on one or more media items.

19. The one or more non-transitory computer readable media of any of clauses 11-18, further comprising generating a container image that includes the executable version of the function and one or more operating system (OS) dependencies of the function, wherein the function subsequently executes within a container corresponding to the container image.

20. In some embodiments, a system comprises one or more memories storing instructions; and one or more processors that are coupled to the one or more memories and, when executing the instructions, are configured to perform one or more compilation operations on source code to generate an executable version of a function that has a first function signature; replace a first data type of a first parameter included in the first function signature with a second data type to generate a second function signature for a client stub function; and generate a remote procedure call (RPC) client that includes the client stub function, wherein the RPC client causes the function to execute when the client stub function is invoked.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   performing one or more compilation operations on source code to generate an executable version of a function that has a first function signature;
   replacing a first data type of a first parameter included in the first function signature with a second data type to generate a second function signature for a client stub function, wherein the first data type is associated with at least one of a video file or an audio file, and the second data type is associated with at least one of a sequence of video frames or one or more component channels of audio; and
   generating a remote procedure call (RPC) client that includes the client stub function, wherein the RPC client causes the function to execute when the client stub function is invoked at a client system, wherein both the executable version of the function is generated automatically and the first data type is replaced automatically on a computer system that is separate from the client system.

2. The computer-implemented method of claim 1, further comprising determining the second data type based on at least one annotation included in the source code.

3. The computer-implemented method of claim 1, further comprising determining that the RPC client is to be generated for the function based on at least one annotation included in the source code.

4. The computer-implemented method of claim 1, wherein generating the RPC client comprises aggregating the client stub function with implementation code, wherein the implementation code includes one or more serialization operations that are to be performed on a set of arguments to generate an invocation message, and wherein the invocation message causes the function to execute when the client stub function is invoked.

5. The computer-implemented method of claim 1, wherein the second function signature is further generated by replacing a third data type of a second parameter included in the first function signature with a fourth data type.

6. The computer-implemented method of claim 1, further comprising aggregating the second function signature and an empty function body to generate the client stub function.

7. The computer-implemented method of claim 1, wherein the function encapsulates at least one algorithm that executes on one or more media items.

8. One or more non-transitory computer readable media including instructions that, when executed by one or more processors, cause the one or more processors to perform the steps of:
   performing one or more compilation operations on source code to generate an executable version of a function that has a first function signature;
   replacing a first data type of a first parameter included in the first function signature with a second data type to generate a second function signature for a client stub function, wherein the first data type is associated with at least one of a video file or an audio file, and the second data type is associated with at least one of a sequence of video frames or one or more component channels of audio; and generating a remote procedure call (RPC) client that includes the client stub function, wherein the RPC client causes the function to execute when the client stub function is invoked at a client system, wherein both the executable version of the function is generated automatically and the first data type is replaced automatically on a computer system that is separate from the client system.

9. The one or more non-transitory computer readable media of claim 8, further comprising determining the second data type based on at least one annotation included in the source code.

10. The one or more non-transitory computer readable media of claim 8, wherein the first parameter comprises an input parameter or an output reference parameter.

11. The one or more non-transitory computer readable media of claim 8, wherein generating the RPC client comprises aggregating the client stub function with implementation code, wherein the implementation code causes the function to execute in a first environment when the client stub function is invoked in a second environment.

12. The one or more non-transitory computer readable media of claim 8, wherein the second function signature is further generated by retaining a third data type of a second parameter included in the first function signature based on one or more annotations included in the source code.

13. The one or more non-transitory computer readable media of claim 8, wherein the client stub function is invoked as part of a workflow in which one or more operations are performed on one or more media items.

14. The one or more non-transitory computer readable media of claim 8, further comprising generating a container image that includes the executable version of the function and one or more operating system (OS) dependencies of the function, wherein the function subsequently executes within a container corresponding to the container image.

15. A system comprising:
one or more memories storing instructions; and
one or more processors that are coupled to the one or more memories and, when executing the instructions, are configured to:
perform one or more compilation operations on source code to generate an executable version of a function that has a first function signature;
replace a first data type of a first parameter included in the first function signature with a second data type to generate a second function signature for a client stub function, wherein the first data type is associated with at least one of a video file or an audio file, and the second data type is associated with at least one of a sequence of video frames or one or more component channels of audio; and
generate a remote procedure call (RPC) client that includes the client stub function, wherein the RPC client causes the function to execute when the client stub function is invoked at a client system, wherein both the executable version of the function is generated automatically and the first data type is replaced automatically on a computer system that is separate from the client system.

16. A computer-implemented method, comprising:
performing one or more compilation operations on source code to generate an executable version of a function that has a first function signature;
replacing a first data type of a first parameter included in the first function signature with a second data type to generate a second function signature for a client stub function;
generating a remote procedure call (RPC) client that includes the client stub function, wherein the RPC client causes the function to execute when the client stub function is invoked at a client system, wherein both the executable version of the function is generated automatically and the first data type is replaced automatically on a computer system that is separate from the client system; and
generating a container image that includes the executable version of the function and one or more operating system (OS) dependencies of the function, wherein the function subsequently executes within a container corresponding to the container image.

* * * * *